(12) United States Patent
Shu et al.

(10) Patent No.: US 11,922,617 B2
(45) Date of Patent: Mar. 5, 2024

(54) METHOD AND SYSTEM FOR DEFECT DETECTION

(71) Applicant: CONTEMPORARY AMPEREX TECHNOLOGY CO., LIMITED, Ningde (CN)

(72) Inventors: Annan Shu, Ningde (CN); Chao Yuan, Ningde (CN); Lili Han, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/196,900

(22) Filed: May 12, 2023

(65) Prior Publication Data
US 2023/0281785 A1  Sep. 7, 2023

Related U.S. Application Data

(63) Continuation of application No. PCT/CN2021/135264, filed on Dec. 3, 2021.

(51) Int. Cl.
*G06T 7/00* (2017.01)
*G06T 7/33* (2017.01)

(52) U.S. Cl.
CPC ............ *G06T 7/0006* (2013.01); *G06T 7/337* (2017.01); *G06T 2207/20084* (2013.01)

(58) Field of Classification Search
CPC .................. G06T 7/0006; G06T 7/337; G06T 2207/20084
See application file for complete search history.

(56) References Cited

U.S. PATENT DOCUMENTS

| 2021/0150227 A1 | 5/2021 | Hu et al. |
| 2021/0279950 A1 | 9/2021 | Phalak |
| 2021/0365699 A1 | 11/2021 | Hu et al. |

(Continued)

FOREIGN PATENT DOCUMENTS

| CN | 108345911 A | 7/2018 |
| CN | 111179229 A | 5/2020 |

(Continued)

OTHER PUBLICATIONS

Contemporary Amperex Technology Co., Limited, International Search Report and Written Opinion, PCTCN2021135264, dated Aug. 30, 2022, 20 pgs.

(Continued)

*Primary Examiner* — Ping Y Hsieh
(74) *Attorney, Agent, or Firm* — XSENSUS LLP

(57) ABSTRACT

The present application provides a method and system for defect detection. The method includes: acquiring a two-dimensional (2D) picture of an object to be detected; inputting the acquired 2D picture to a trained defect segmentation model to obtain a segmented 2D defect mask, where the defect segmentation model is trained based on a multi-level feature extraction instance segmentation network with intersection over union (IoU) thresholds being increased level by level, and the 2D defect mask includes information about a defect type, a defect size, and a defect location of a segmented defect region; and determining the segmented 2D defect mask based on a predefined defect rule to output a defect detection result.

17 Claims, 8 Drawing Sheets

(56) References Cited

U.S. PATENT DOCUMENTS

| | | | |
|---|---|---|---|
| 2022/0036538 A1* | 2/2022 | Steiman | G06T 7/10 |
| 2022/0084181 A1* | 3/2022 | Isken | G01N 21/8422 |
| 2023/0107092 A1* | 4/2023 | Jain | G01N 21/95 |
| | | | 382/103 |

FOREIGN PATENT DOCUMENTS

| | | |
|---|---|---|
| CN | 111768365 A | 10/2020 |
| CN | 112766184 A | 5/2021 |
| CN | 112767345 A | 5/2021 |
| CN | 113658206 A | 11/2021 |

OTHER PUBLICATIONS

Extended European search report dated Jan. 4, 2024, in corresponding European patent Application No. 21962758.5, 8 pages.
Linwei Ye et al., "Depth-Aware Object Instance Segmentation", 2017 IEEE International Conference on Image Processing (ICIP), IEEE, Sep. 17, 2017, pp. 325-329, total 5 pages.

* cited by examiner

METHOD AND SYSTEM FOR DEFECT DETECTION

CROSS-REFERENCE TO RELATED APPLICATION

This application is a continuation of PCT Patent Application No. PCT/CN2021/135264, entitled "METHOD AND SYSTEM FOR DEFECT DETECTION" filed on Dec. 3, 2021, which is incorporated herein by reference in its entirety.

TECHNICAL FIELD

The present application relates to the field of artificial intelligence, and in particular, to a method and system for defect detection.

BACKGROUND ART

In the field of modern industrial manufacturing, defect detection of industrial products is a key part of the quality detection of industrial products. This is very important for improving product processes and increasing a production line yield.

However, in conventional industrial manufacturing, the defect detection of industrial products usually uses manual observation. This makes it difficult to directly observe defects when an object to be detected is very small, and there are problems of high detection costs and low-quality detection efficiency.

SUMMARY OF THE INVENTION

In view of the above problem, the present application provides a method and system for defect detection, so as to detect defects when an object to be detected is very small, significantly reduce detection costs, and greatly improve quality detection efficiency.

According to a first aspect, the present application provides a method for defect detection, the method including: acquiring a two-dimensional (2D) picture of an object to be detected; inputting the acquired 2D picture to a trained defect segmentation model to obtain a segmented 2D defect mask, where the defect segmentation model is trained based on a multi-level feature extraction instance segmentation network with intersection over union (IoU) thresholds being increased level by level, and the 2D defect mask includes information about a defect type, a defect size, and a defect location of a segmented defect region; and determining the segmented 2D defect mask based on a predefined defect rule to output a defect detection result.

In the technical solution of this embodiment of the present application, an instance segmentation network based on a multi-level feature extraction architecture is designed, such that better segmentation and detection results can be achieved even in a instance segmentation model for which positive samples are particularly difficult to obtain or the number of positive samples are extremely small, to achieve no underkill, and greatly reduce an overkill probability.

In some embodiments, the method further includes: acquiring a three-dimensional (3D) picture of the object to be detected; preprocessing the acquired 3D picture to obtain an image with depth information of the object to be detected; inputting the obtained image with depth information to the trained defect segmentation model to obtain a segmented 3D defect mask, where the 3D defect mask includes information about a defect depth of a segmented defect region; and performing, based on a predefined defect rule, fusion and determination on the segmented 2D defect mask and the segmented 3D defect mask to output a defect detection result. Results of 2D and 3D detection are combined to obtain segmentation results about a depth for actual needs, so that detection results are more accurate, and when a defect is not obvious in a 2D image form, the results of 2D and 3D detection can be fused to achieve no underkill, and greatly reduce an overkill probability.

In some embodiments, the performing, based on a predefined defect rule, fusion and determination on the segmented 2D defect mask and the segmented 3D defect mask further includes: performing pixel-level alignment on the 2D picture and the 3D picture by using a coordinate transformation matrix between the acquired 2D picture and the acquired 3D picture, to obtain aligned pictures; filling the segmented 2D defect mask and the segmented 3D defect mask into the aligned pictures; and performing, based on the predefined defect rule, fusion and determination on the segmented 2D defect mask and the segmented 3D defect mask on the aligned pictures to output a defect detection result. Defects can be detected more intuitively and accurately by aligning and filling corresponding masks when fusing 2D and 3D segmentation results.

In some embodiments, the multi-level feature extraction instance segmentation network is obtained by cascading three levels of instance segmentation networks, where IoU thresholds for positive and negative sample sampling are set to 0.2 to 0.4 at the first level, are set to 0.3 to 0.45 at the second level, and are set to 0.5 to 0.7 at the third level. When sampling positive and negative samples, setting a lower IoU threshold at a first stage effectively avoids an overfitting problem caused by an imbalance of positive and negative samples, and in addition, progressive fine sampling is performed by increasing an IoU threshold level by level, to obtain higher feature extraction precision and make a result of defect detection more accurate.

In some embodiments, the IoU thresholds are set to 0.3 at the first level, are set to 0.4 at the second level, and are set to 0.5 at the third level. The IoU thresholds of the levels in the multi-level feature extraction instance segmentation network are set to 0.3, 0.4, and 0.5 respectively such that the positive and negative samples can be sampled level by level more finely, thereby making a result of defect detection more accurate.

In some embodiments, a defect mask output by the multi-level feature extraction instance segmentation network is obtained based on a weighted average of defect masks output by an instance segmentation network at each level. By performing a weighted average on the defect masks output by the network at each level, a result of defect detection is more accurate, and an overkill probability is greatly reduced.

In some embodiments, the determining the segmented defect mask based on a predefined defect rule to output a defect detection result further includes: when a size or a depth of the segmented defect region is greater than a predefined threshold for a defect type of the defect region, outputting a defect class as a defect detection result. Applying different defect rules for determination based on different types of defects makes it possible to adjust a threshold of a defect specification in a customized manner during detection, thereby making a detection algorithm more flexible.

In some embodiments, the defect type includes a pit defect and a protrusion defect, and the determining the segmented defect mask based on a predefined defect rule to output a defect detection result further includes: when the defect type of the defect region is a pit defect, if both the segmented 2D defect mask and the segmented 3D defect mask include the defect region, or the depth of the defect region is greater than a predefined threshold for the pit defect, outputting a defect class as the defect detection result; or when the defect type of the defect region is a protrusion defect, if both the segmented 2D defect mask and the segmented 3D defect mask include the defect region, and the size and the depth of the defect region are greater than predefined thresholds for the protrusion defect, outputting a defect class as a defect detection result. Applying different defect rules for determination depending on different classes of pit defects and protrusion defects makes it possible to adjust a threshold of a defect specification in a customized manner during detection, thereby making a detection algorithm more flexible.

According to a second aspect, the present application provides a system for defect detection, the system including: an image acquisition module configured to acquire a two-dimensional (2D) picture of an object to be detected; a defect segmentation module configured to input the acquired 2D picture to a trained defect segmentation model to obtain a segmented 2D defect mask, where the defect segmentation model is trained based on a multi-level feature extraction instance segmentation network with intersection over union (IoU) thresholds being increased level by level, and the 2D defect mask includes information about a defect type, a defect size, and a defect location of a segmented defect region; and a defect determination module configured to determine the segmented 2D defect mask based on a predefined defect rule to output a defect detection result.

In the technical solution of this embodiment of the present application, an instance segmentation network based on a multi-level feature extraction architecture is designed, such that better segmentation and detection results can be achieved even in a instance segmentation model for which positive samples are particularly difficult to obtain or the number of positive samples are extremely small, to achieve no underkill, and greatly reduce an overkill probability.

In some embodiments, the image acquisition module is further configured to acquire a three-dimensional (3D) picture of the object to be detected; the defect segmentation module is further configured to: preprocess the acquired 3D picture to obtain an image with depth information of the object to be detected; and input the obtained image with depth information to the trained defect segmentation model to obtain a segmented 3D defect mask, where the 3D defect mask includes information about a defect depth of a segmented defect region; and the defect determination module is further configured to perform, based on a predefined defect rule, fusion and determination on the segmented 2D defect mask and the segmented 3D defect mask to output a defect detection result. Results of 2D and 3D detection are combined to obtain segmentation results about a depth for actual needs, so that detection results are more accurate, and when a defect is not obvious in a 2D image form, the results of 2D and 3D detection can be fused to achieve no underkill, and greatly reduce an overkill probability.

In some embodiments, the defect determination module is further configured to: perform pixel-level alignment on the 2D picture and the 3D picture by using a coordinate transformation matrix between the acquired 2D picture and the acquired 3D picture, to obtain aligned pictures; fill the segmented 2D defect mask and the segmented 3D defect mask into the aligned pictures; and perform, based on the predefined defect rule, fusion and determination on the segmented 2D defect mask and the segmented 3D defect mask on the aligned pictures to output a defect detection result. Defects can be detected more intuitively and accurately by aligning and filling corresponding masks when fusing 2D and 3D segmentation results.

In some embodiments, the multi-level feature extraction instance segmentation network is obtained by cascading three levels of instance segmentation networks, where IoU thresholds for positive and negative sample sampling are set to 0.2 to 0.4 at the first level, are set to 0.3 to 0.45 at the second level, and are set to 0.5 to 0.7 at the third level. When sampling positive and negative samples, setting a lower IoU threshold at a first stage effectively avoids an overfitting problem caused by an imbalance of positive and negative samples, and in addition, progressive fine sampling is performed by increasing an IoU threshold level by level, to obtain higher feature extraction precision and make a result of defect detection more accurate.

In some embodiments, the IoU thresholds are set to 0.3 at the first level, are set to 0.4 at the second level, and are set to 0.5 at the third level. The IoU thresholds of the levels in the multi-level feature extraction instance segmentation network are set to 0.3, 0.4, and 0.5 respectively such that the positive and negative samples can be sampled level by level more finely, thereby making a result of defect detection more accurate.

In some embodiments, a defect mask output by the multi-level feature extraction instance segmentation network is obtained based on a weighted average of defect masks output by an instance segmentation network at each level. By performing a weighted average on the defect masks output by the network at each level, a result of defect detection is more accurate, and an overkill probability is greatly reduced.

In some embodiments, the defect determination module is further configured to: when a size or a depth of the segmented defect region is greater than a predefined threshold for a defect type of the defect region, output a defect class as a defect detection result. Applying different defect rules for determination based on different types of defects makes it possible to adjust a threshold of a defect specification in a customized manner during detection, thereby making a detection algorithm more flexible.

In some embodiments, the defect type includes a pit defect and a protrusion defect, and the defect determination module is further configured to: when the defect type of the defect region is a pit defect, if both the segmented 2D defect mask and the segmented 3D defect mask include the defect region, or the depth of the defect region is greater than a predefined threshold for the pit defect, output a defect class as the defect detection result; or when the defect type of the defect region is a protrusion defect, if both the segmented 2D defect mask and the segmented 3D defect mask include the defect region, and the size and the depth of the defect region are greater than predefined thresholds for the protrusion defect, output a defect class as a defect detection result. Applying different defect rules for determination depending on different classes of pit defects and protrusion defects makes it possible to adjust a threshold of a defect specification in a customized manner during detection, thereby making a detection algorithm more flexible.

According to a third aspect, the present application provides an apparatus for defect detection, the apparatus including: a memory storing computer-executable instructions; and at least one processor, where the computer-executable instructions, when executed by the at least one processor, cause the apparatus to perform the following operations: acquiring a two-dimensional (2D) picture of an object to be detected; inputting the acquired 2D picture to a trained defect segmentation model to obtain a segmented 2D defect mask, where the defect segmentation model is trained based on a multi-level feature extraction instance segmentation network with intersection over union (IoU) thresholds being increased level by level, and the 2D defect mask includes information about a defect type, a defect size, and a defect location of a segmented defect region; and determining the segmented 2D defect mask based on a predefined defect rule to output a defect detection result.

In the technical solution of this embodiment of the present application, an instance segmentation network based on a multi-level feature extraction architecture is designed, such that better segmentation and detection results can be achieved even in a instance segmentation model for which positive samples are particularly difficult to obtain or the number of positive samples are extremely small, to achieve no underkill, and greatly reduce an overkill probability.

In some embodiments, the computer-executable instructions, when executed, further cause the at least one processor to perform the following operations: acquiring a three-dimensional (3D) picture of the object to be detected; preprocessing the acquired 3D picture to obtain an image with depth information of the object to be detected; inputting the obtained image with depth information to the trained defect segmentation model to obtain a segmented 3D defect mask, where the 3D defect mask includes information about a defect depth of a segmented defect region; and performing, based on a predefined defect rule, fusion and determination on the segmented 2D defect mask and the segmented 3D defect mask to output a defect detection result. Results of 2D and 3D detection are combined to obtain segmentation results about a depth for actual needs, so that detection results are more accurate, and when a defect is not obvious in a 2D image form, the results of 2D and 3D detection can be fused to achieve no underkill, and greatly reduce an overkill probability.

In some embodiments, the computer-executable instructions, when executed, further cause the at least one processor to perform the following operations: performing pixel-level alignment on the 2D picture and the 3D picture by using a coordinate transformation matrix between the acquired 2D picture and the acquired 3D picture, to obtain aligned pictures; filling the segmented 2D defect mask and the segmented 3D defect mask into the aligned pictures; and performing, based on the predefined defect rule, fusion and determination on the segmented 2D defect mask and the segmented 3D defect mask on the aligned pictures to output a defect detection result. Defects can be detected more intuitively and accurately by aligning and filling corresponding masks when fusing 2D and 3D segmentation results.

In some embodiments, the multi-level feature extraction instance segmentation network is obtained by cascading three levels of instance segmentation networks, where IoU thresholds for positive and negative sample sampling are set to 0.2 to 0.4 at the first level, are set to 0.3 to 0.45 at the second level, and are set to 0.5 to 0.7 at the third level. When sampling positive and negative samples, setting a lower IoU threshold at a first stage effectively avoids an overfitting problem caused by an imbalance of positive and negative samples, and in addition, progressive fine sampling is performed by increasing an IoU threshold level by level, to obtain higher feature extraction precision and make a result of defect detection more accurate.

In some embodiments, the IoU thresholds are set to 0.3 at the first level, are set to 0.4 at the second level, and are set to 0.5 at the third level. The IoU thresholds of the levels in the multi-level feature extraction instance segmentation network are set to 0.3, 0.4, and 0.5 respectively such that the positive and negative samples can be sampled level by level more finely, thereby making a result of defect detection more accurate.

According to a fourth aspect, the present application provides a computer-readable storage medium storing computer-executable instructions, where the computer-executable instructions, when executed by a computing device, cause the computing device to implement a method for defect detection according to any one of the above aspects.

The above description is only an overview of the technical solutions of the present application. In order to more clearly understand the technical means of the present application to implement same according to the contents of the specification, and in order to make the above and other objects, features, and advantages of the present application more obvious and understandable, specific embodiments of the present application are exemplarily described below.

BRIEF DESCRIPTION OF THE DRAWINGS

To understand in detail a manner used in the above features of the present application, a more detailed description of what has been briefly summarized above may be made with reference to various embodiments, some aspects of which are illustrated in the accompanying drawings. It is to be noted, however, that the accompanying drawings illustrate only some typical aspects of the present application and are therefore not to be considered limiting of the scope thereof, because the description may allow other equally effective aspects.

Figure 1:
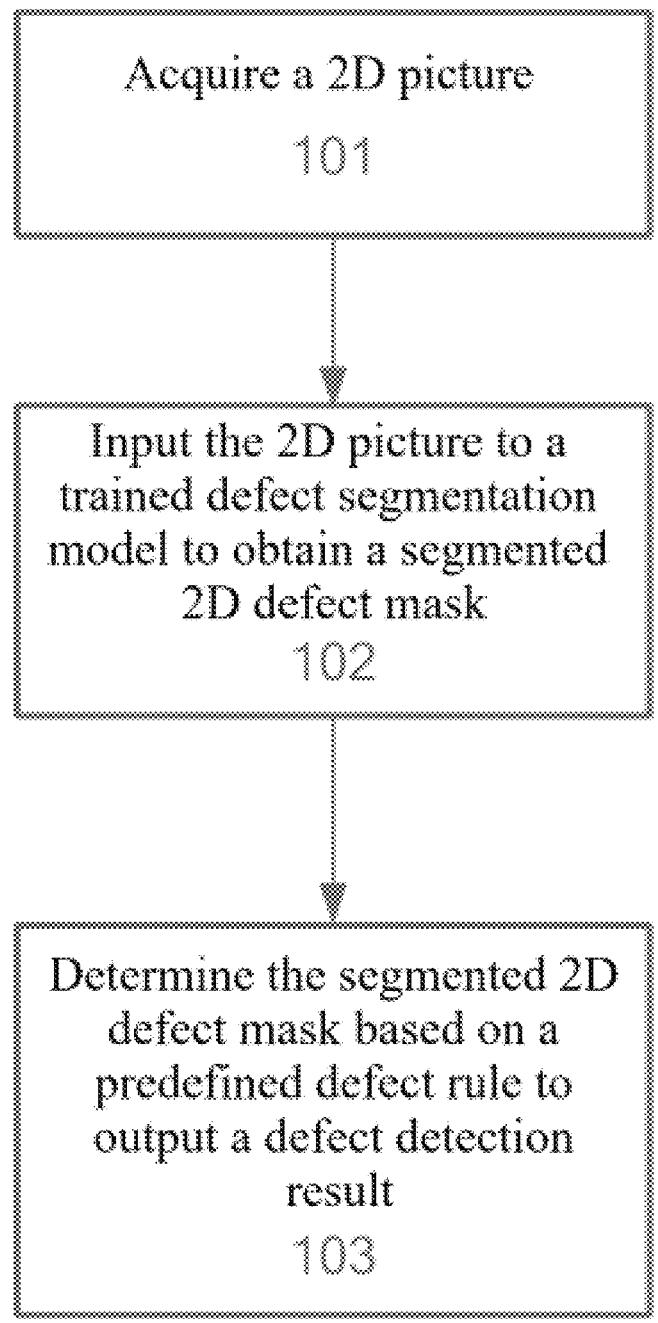
FIG. 1 is an example flowchart of a method for defect detection according to an embodiment of the present application.

REFERENCE NUMERALS IN THE EMBODIMENTS system for defect detection 800, image acquisition module 801, defect segmentation module 802, defect detection module 803, apparatus 900, memory 901, and processor 902.

DETAILED DESCRIPTION OF EMBODIMENTS

Embodiments of the technical solutions of the present application will be described in more detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "including" and "having" and any variations thereof in the description and the claims of the present application as well as the brief description of the accompanying drawings described above are intended to cover non-exclusive inclusion.

In the description of the embodiments of the present application, the phrase "a plurality of" means two or more, unless otherwise explicitly and specifically defined. The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

At present, from the perspective of the development of the market situation, batteries are used more and more widely. Traction batteries are not only used in energy storage power systems such as hydroelectric power plants, thermal power plants, wind power plants and solar power plants, and the traction batteries are further widely used in electric transportation means such as electric bicycles, electric motorcycles, and electric vehicles and in many fields such as military equipment and aerospace. With the continuous expansion of the application field of traction batteries, the market demand for the traction batteries is also expanding. Sealing pin welding is an essential link in a production process of traction batteries. Whether the sealing pin welding meets the standard directly affects the safety of the batteries. A sealing pin welding region is referred to as a weld bead. Due to changes in temperature, environment, and laser angle during welding, there are often defects such as burst lines (pits) and melted beads on the weld bead.

Currently, with the development of machine vision and industrial automation, there are methods for automatic defect detection based on artificial intelligence. However, when an object to be detected is very small or a defect is difficult to distinguish, a conventional feature extraction network cannot detect defects well, and underkill or overkill easily occurs. For example, an existing solution uses Res2Net as a feature extraction module. However, because sealing pins have some defects in forms that are not obvious and have very small defects, only using Res2Net for training easily causes a ratio between positive and negative samples to be too unbalanced, resulting in insufficient model convergence, and resulting in a limited capability of the model to detect hard samples. In addition, defect detection is performed on existing samples only using two-dimensional (2D) pictures. However, pits and protrusions that appear in laser welding are defects caused by depth problems, and 2D forms of the defects may be very indistinct. Therefore, for defects with a depth, only using 2D pictures for detection is very prone to cause erroneous determination.

In view of the above, in order to solve a problem that underkill or overkill easily occurs for indistinct defects and defects with only a depth in defect detection, the inventors have conducted in-depth research and designed a multi-level backbone network structure that can more accurately extract defect features, and a defect detection algorithm that fuses results of 2D and 3D instance segmentation algorithms. In the present application, an instance segmentation network based on a multi-level feature extraction architecture is used, such that better segmentation and detection results can be achieved even in a instance segmentation model for which positive samples are particularly difficult to obtain or the number of positive samples are extremely small. In addition, the present application combines results of 2D and 3D detection, and performs customizable fusion on the results, and obtains a depth-related model result for actual needs, making detection of defects with a depth more accurate. Compared with a previous algorithm, the present application reduces an underkill rate of defects such as sealing pin pits and melted beads to 0%, and reduces an overkill rate to less than 0.02%. In addition, the present application may adjust a threshold of a defect specification in a customized manner during detection, thereby making a detection algorithm more flexible.

It can be appreciated that the present application can be applied to the field of defect detection combined with artificial intelligence (AI), and the method and system for defect detection disclosed in the embodiments of the present application may be used, but not limited to, for defect detection of a sealing pin weld bead, and may be further used for defect detection of various other products in modern industrial manufacturing.

In the following embodiments, for the convenience of description, defect detection for the sealing pin weld bead is taken as an example for description.

Figure 2:
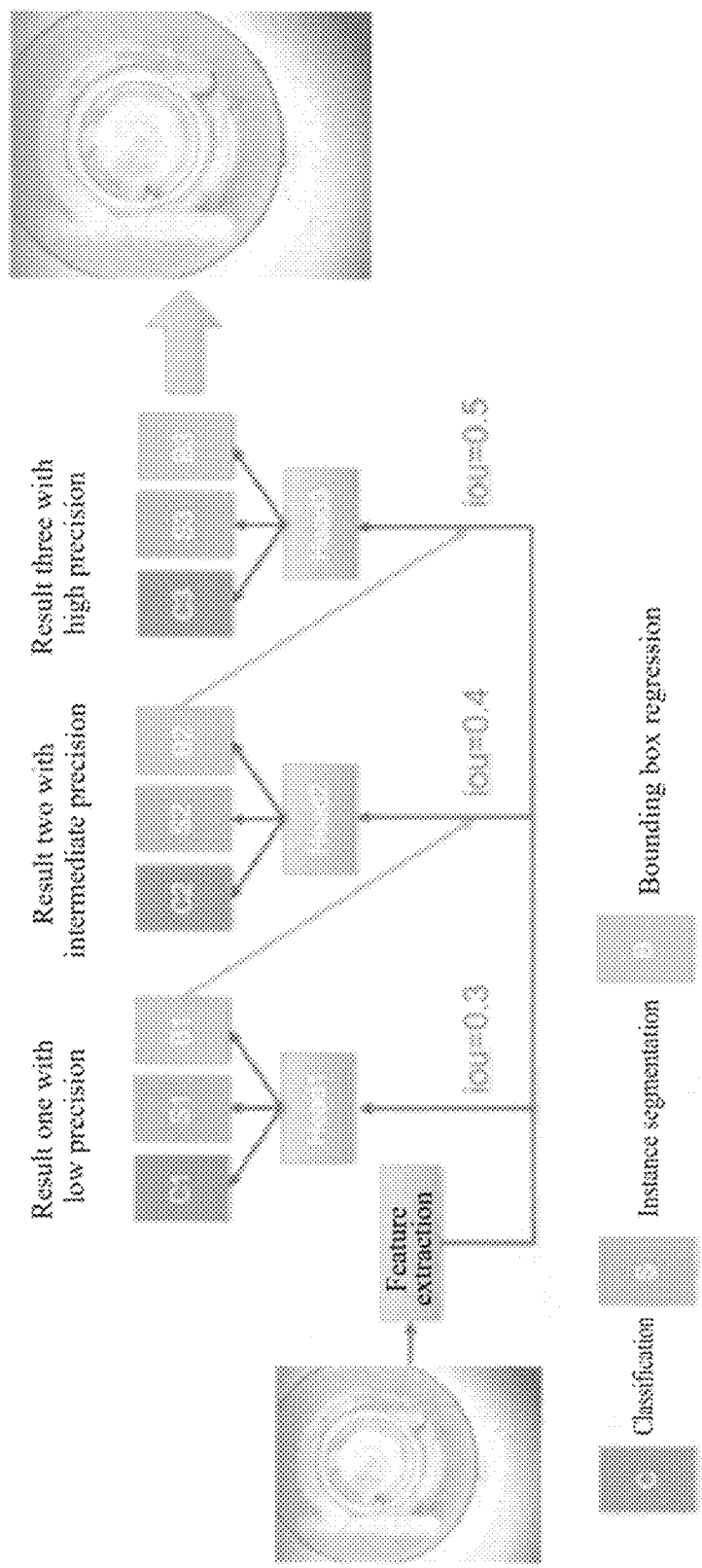
FIG. 2 is a schematic structural diagram of an instance segmentation network based on a multi-level feature extraction architecture according to an embodiment of the present application.
Figure 3:
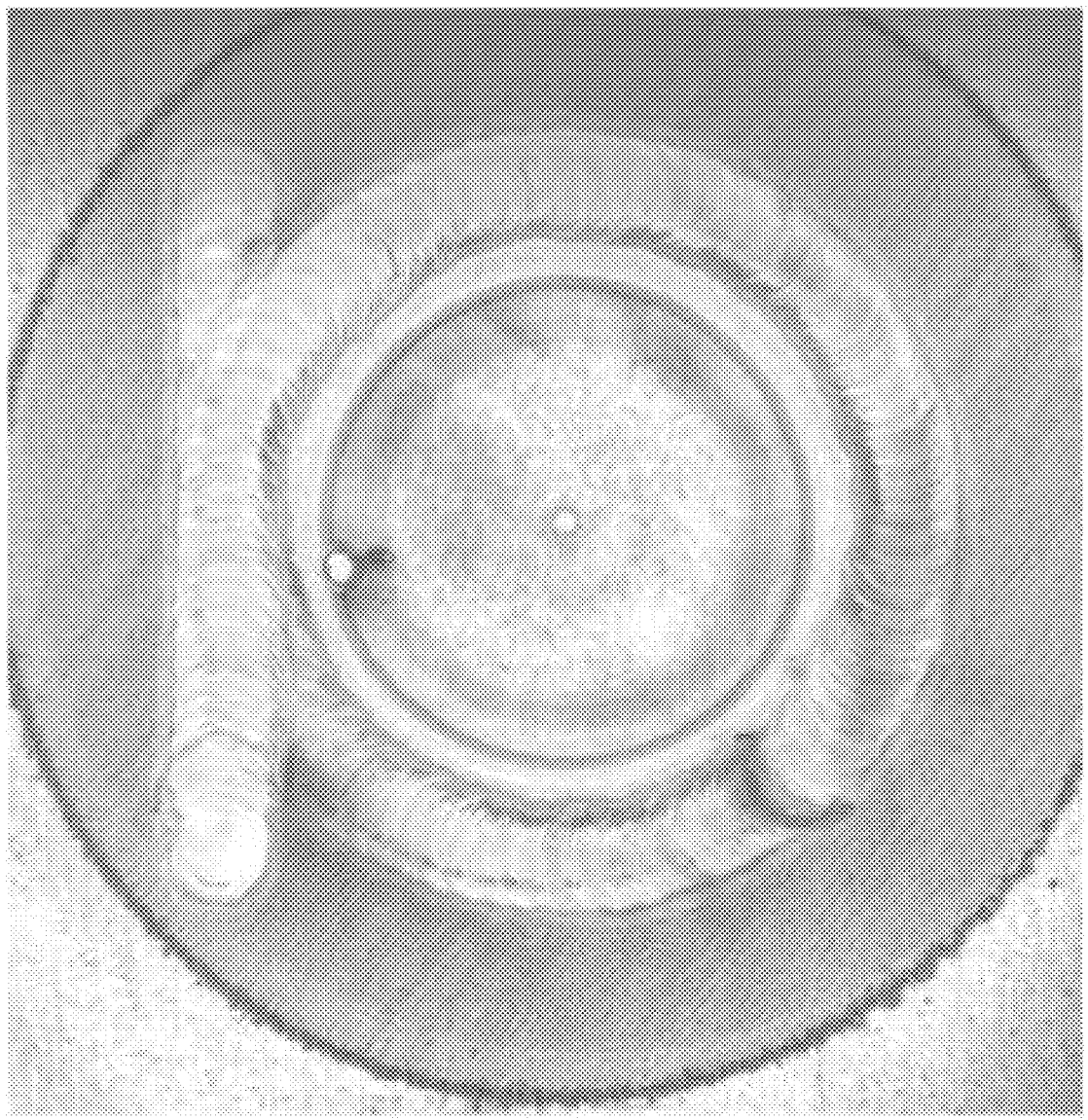
FIG. 3 is a schematic diagram of a 2D defect segmentation result according to an embodiment of the present application.

FIG. 1 is an example flowchart of a method 100 for defect detection according to an embodiment of the present application. According to an embodiment of the present application, refer to FIG. 1, and further refer to FIG. 2 and FIG. 3, where FIG. 2 is a schematic structural diagram of an instance segmentation network based on a multi-level feature extraction architecture according to an embodiment of the present application, and FIG. 3 is a schematic diagram of a 2D defect segmentation result according to an embodiment of the present application. The method 100 starts at step 101 in which a two-dimensional (2D) picture of an object to be detected is acquired. In step 102, the acquired 2D picture is input to a trained defect segmentation model to obtain a segmented 2D defect mask, where the defect segmentation model is trained based on a multi-level feature extraction instance segmentation network with intersection over union (IoU) thresholds being increased level by level, and the segmented 2D defect mask includes information about a defect type, a defect size, and a defect location of a segmented defect region. In step 103, the segmented 2D defect mask is determined based on a predefined defect rule to output a defect detection result.

A network architecture of the defect segmentation model in step 102 is shown in FIG. 2, and the network architecture is obtained by cascading three levels of instance segmentation networks. Usually in a training phase of the instance segmentation network, an intersection over union (IoU) between each proposal box and each ground truth box is first calculated. An IoU threshold (for example, usually 0.5) is manually set to divide proposal boxes into positive samples (foreground) and negative samples (background), and the positive and negative samples are sampled so that a ratio between the positive and negative samples is as close as possible to 1:3 (the total number of the positive and negative samples is usually 128). Then, these proposal boxes (for example, usually 128 proposal boxes) are send into a region of interest (ROI) pooling layer, and finally classification and bounding box regression are performed. However, in a current application scenario, since a pit feature is very indistinct, directly setting the IoU threshold to 0.5 may cause the following two problems: 1) There are very few proposal boxes that meet this threshold condition, which can easily result in overfitting; and 2) there is a serious mismatch problem, because a current semantic segmentation structure itself has this problem, this problem is more serious when the IoU threshold is set higher. The above two problems may both result in a decrease of defect feature extraction performance. Therefore, in the present application, extraction of the proposal boxes is divided into three stages, where a small IoU threshold is set at the first stage and the IoU threshold is increased stage by stage. The 2D defect mask output by the defect segmentation model in FIG. 2 is shown in FIG. 3. For the sake of clarity, FIG. 3 shows a result of the 2D defect mask segmented during detection of a sealing pin weld bead being overlaid with an original 2D picture. A gray region in the lower-right corner is a form of the segmented mask after coloring. This region indicates a detected pit defect, and a segmentation result is relatively accurate.

Therefore, in the defect detection, an instance segmentation network based on a multi-level feature extraction architecture is used, such that better segmentation and detection results can be achieved even in an instance segmentation model for which positive samples are particularly difficult to obtain or the number of positive samples are extremely small, to achieve no underkill, and greatly reduce an overkill probability.

Figure 4:
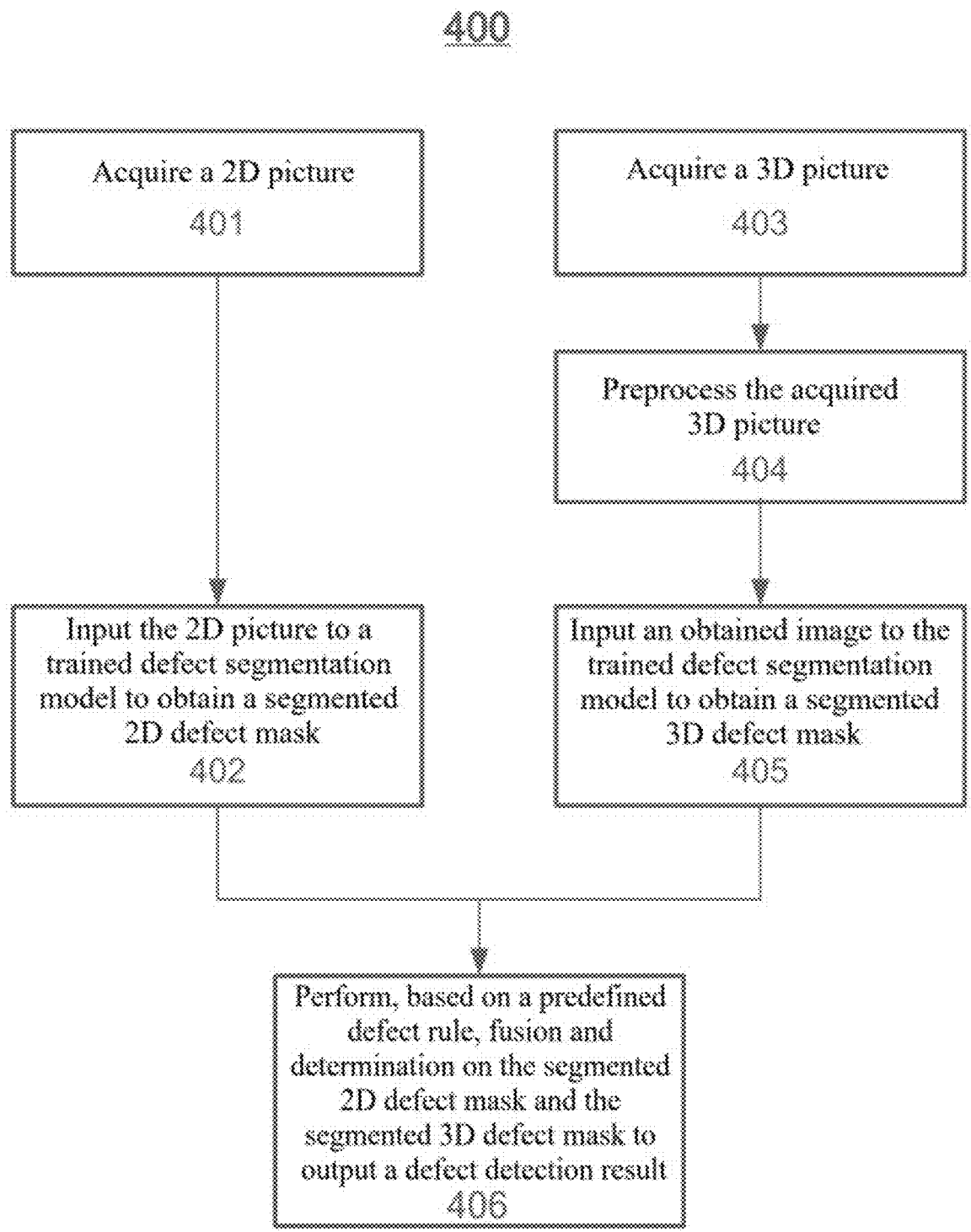
FIG. 4 is an example flowchart of a method for defect detection according to another embodiment of the present application.
Figure 5:
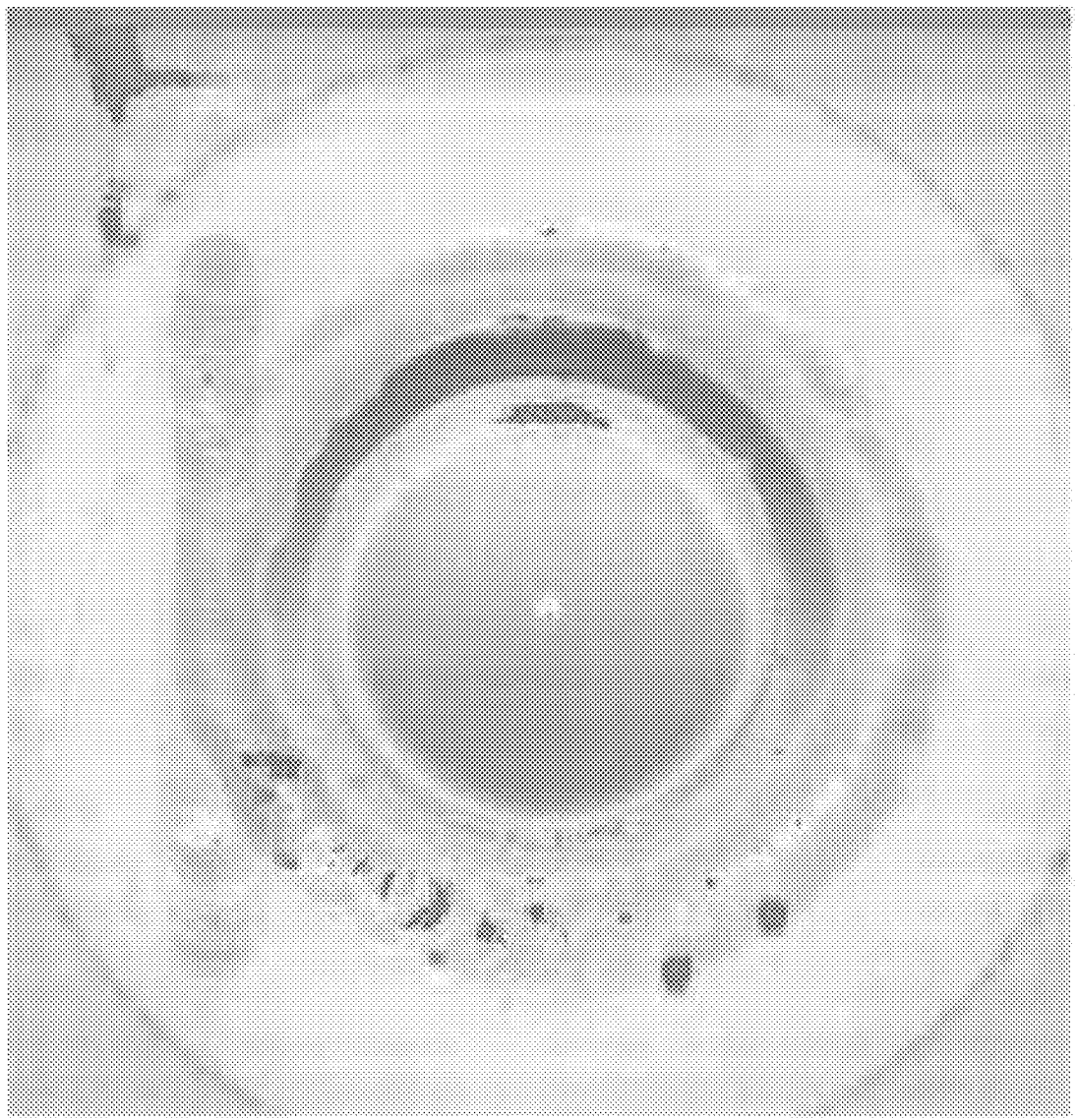
FIG. 5 is a schematic diagram of a pseudo-colored image according to an embodiment of the present application.
Figure 6:
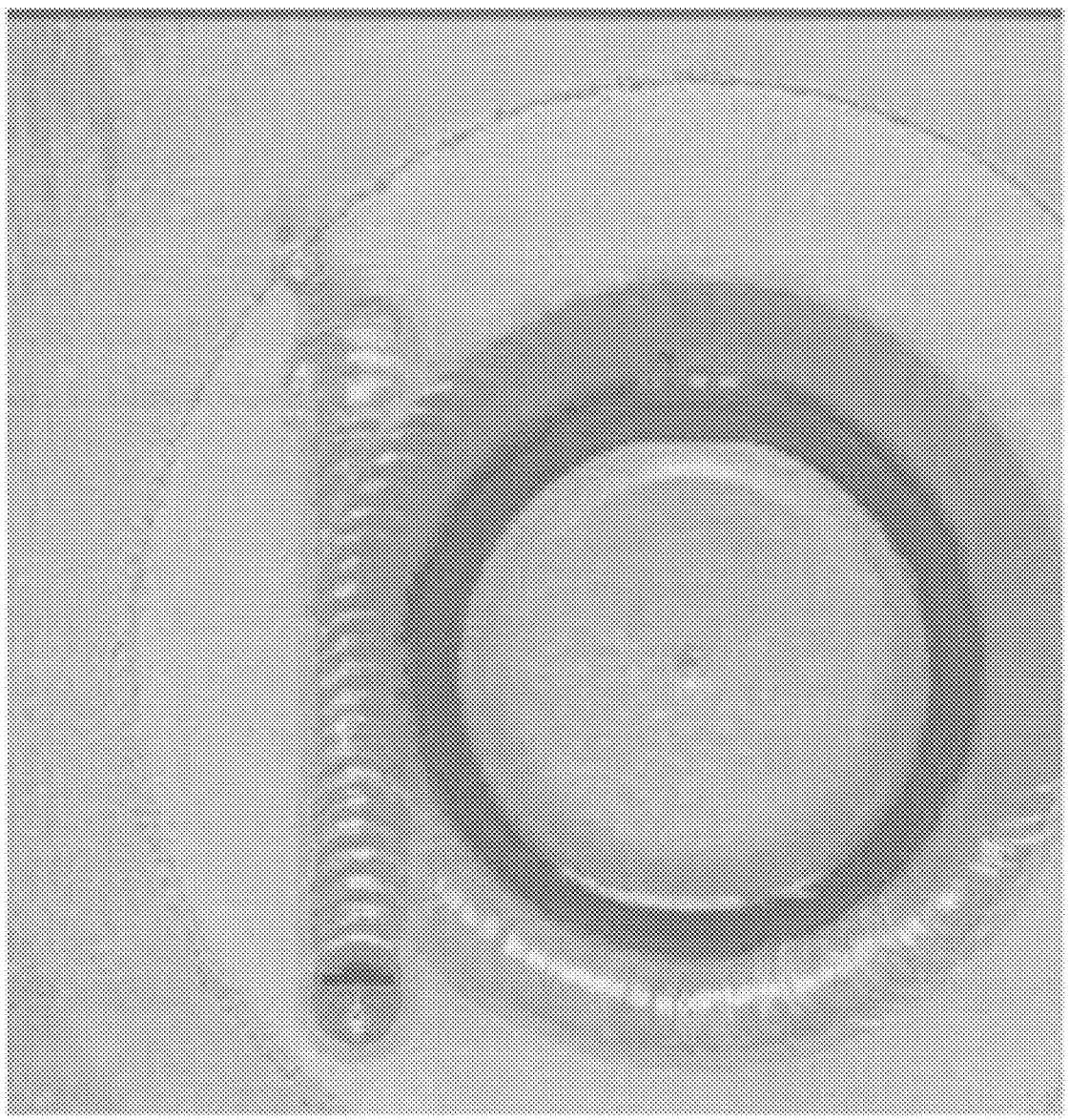
FIG. 6 is a schematic diagram of a 3D defect segmentation result according to an embodiment of the present application.

According to an embodiment of the present application, refer to FIG. 4 to FIG. 6. FIG. 4 is an example flowchart of a method 400 for defect detection according to another embodiment of the present application; FIG. 5 is a schematic diagram of a rendered pseudo-colored image according to an embodiment of the present application; and FIG. 6 is a schematic diagram of a 3D defect segmentation result according to an embodiment of the present application. Steps 401 and 402 in the method 400 are the same as steps 101 and 102 in the method 100, and details are not described herein again. Further, in step 403, a three-dimensional (3D) picture of the object to be detected is acquired. In step 404, the acquired 3D picture is preprocessed to obtain an image with depth information of the object to be detected. In step 405, the obtained image with depth information is input to the trained defect segmentation model to obtain a segmented 3D defect mask, where the 3D defect mask includes information about a defect depth of a segmented defect region. In step 406, fusion and determination are performed, based on a predefined defect rule, on the segmented 2D defect mask and the segmented 3D defect mask to output a defect detection result.

Usually, a 3D camera (for example, a depth camera) is used to acquire a 3D image of the object to be detected, where the acquired 3D image can be stored in the form of a depth image, and a grayscale value of the depth image represents depth information in a Z direction. The depth image and a 2D image generally have location consistency. In other words, pixels in the depth image are in a one-to-one correspondence with pixels in the 2D image. To make depth information more easily distinguishable by humans and machines, it is usually necessary to preprocess an acquired depth image to obtain an image with depth information. In some cases, a captured depth image may be rendered to obtain a pseudo-colored image, as shown in FIG. 5. For example, a grayscale image may be pseudo-colorized using a predefined colormap (for example, applycolormap (pseudo-color function) is used in OpenCV) so that depth information can be more easily perceived by humans and machines. The 3D defect mask output by the defect segmentation model in FIG. 2 is shown in FIG. 6. For the sake of clarity, FIG. 6 shows a result of the 3D defect mask segmented during detection of a sealing pin weld bead being overlaid with an original 3D picture. A gray region in the upper-left corner is a contour of the segmented mask, which indicates segmentation information of a related defect based on a depth map, and a type, an area size, and a depth of the defect can be directly determined through the result.

Results of 2D and 3D detection are combined to obtain segmentation results about a depth for actual needs, so that detection results are more accurate, and when a defect is not obvious in a 2D image form (for example, a difference between a 2D image form and a normal weld bead of a pit is indistinct), the results of 2D and 3D detection can be fused to achieve no underkill, and greatly reduce an overkill probability.

Figure 7:
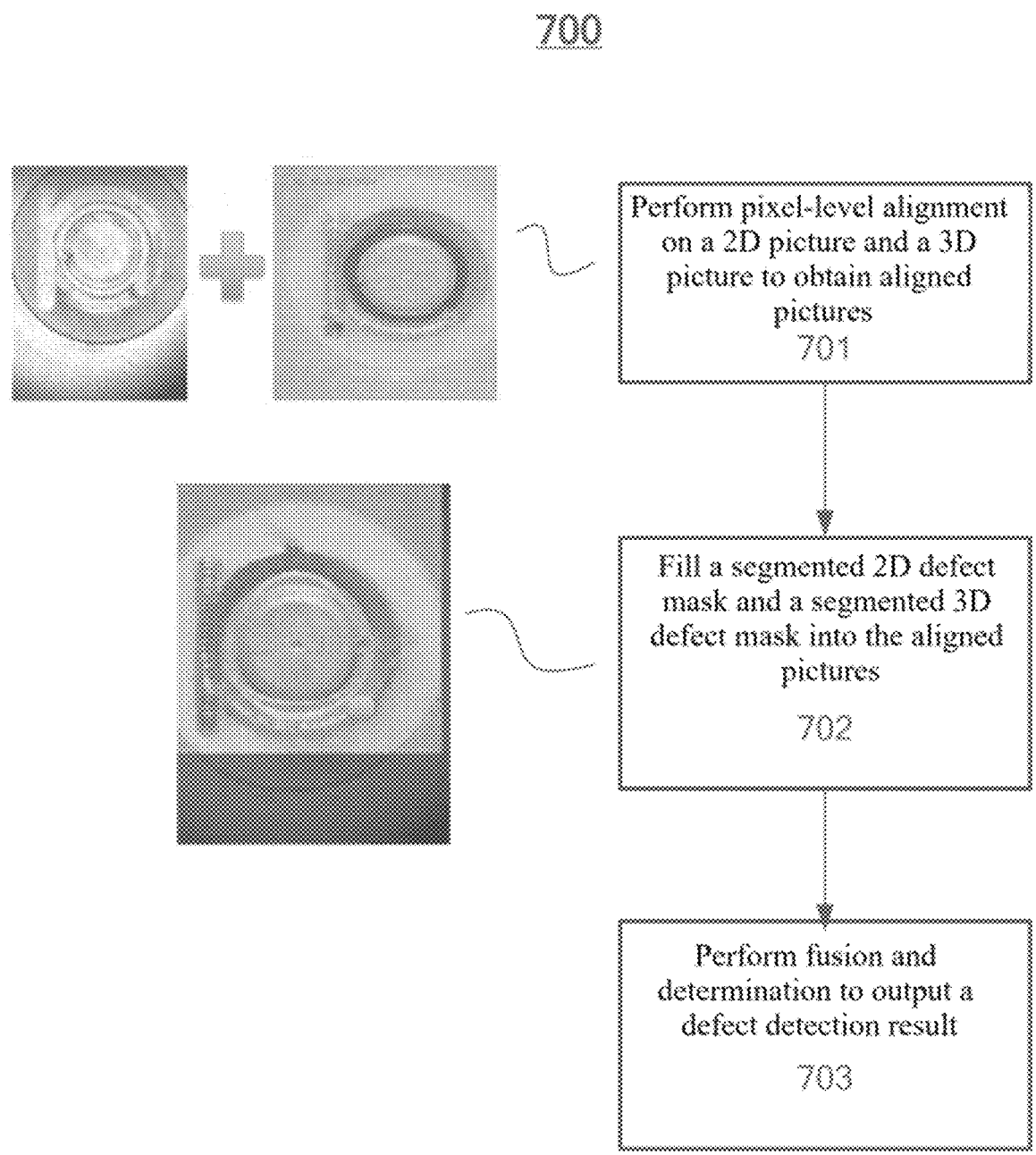
FIG. 7 is an example flowchart of fusion processing of 2D and 3D segmentation results according to an embodiment of the present application.

According to an embodiment of the present application, still refer to FIG. 3, FIG. 4, and FIG. 6, and further refer to FIG. 7. FIG. 7 is an example flowchart of fusion processing 700 of 2D and 3D segmentation results according to an embodiment of the present application. A step of post-processing the 2D and 3D segmentation results starts at block 701 in which pixel-level alignment is performed on the 2D picture and the 3D picture by using a coordinate transformation matrix between the acquired 2D picture and the acquired 3D picture, to obtain aligned pictures. In block 702, the segmented 2D defect mask and the segmented 3D defect mask are filled into the aligned pictures. In block 703, fusion and determination are performed, based on the predefined defect rule, on the segmented 2D defect mask and the segmented 3D defect mask on the aligned pictures to output a defect detection result.

Because it is required to perform fusion and determination on the segmented 2D and 3D defect masks, it is required to perform pixel-level alignment on the originally acquired 2D and 3D pictures to locate a defect location, so that it can be determined whether the defect is detected in both the 2D and 3D pictures during the fusion and determination. Specifically, at first, the acquired 2D and 3D pictures are separately preprocessed, where the 2D picture is gray scaled to obtain a 2D gray scaled picture, and a brightness picture is separated from the 3D picture. Then, in the obtained 2D gray scaled picture and the obtained 3D brightness picture, three identical location points of sealing pin welding are selected in advance, spatial transformation is performed thereon (for example, using OpenCV), a coordinate transformation equation is solved to obtain a coordinate transformation matrix between the 2D picture and the 3D picture, and transformation and pixel-level alignment are performed on the 2D picture and the 3D picture by using the coordinate transformation matrix, to obtain aligned overlaid pictures. After the alignment, the segmented 2D defect mask and the segmented 3D defect mask may be filled into corresponding locations of the aligned overlaid pictures. Then, fusion and determination may be performed, based on the predefined defect rule, on the segmented 2D defect mask and the segmented 3D defect mask to output the defect detection result. As shown in FIG. 7, the 2D defect mask and the 3D defect mask include the same defect region (such as a gray marked region), and a type of the defect region is a pit, which indicates that a pit in a 2D detection result is detected again during the 3D detection, so that the defect detection result is output as a defect class.

It can be learned that the defect region can be located in the 2D and 3D picture at the same time by aligning and filling corresponding masks when fusing the 2D and 3D segmentation results, so that the defect can be detected more intuitively and accurately.

According to an embodiment of the present application, still refer to FIG. 2. The defect segmentation model used in the present application for defect segmentation is trained by a multi-level feature extraction instance segmentation network. The multi-level feature extraction instance segmentation network is obtained by cascading three levels of instance segmentation networks, where IoU thresholds for positive and negative sample sampling are set to 0.2 to 0.4 at the first level, are set to 0.3 to 0.45 at the second level, and are set to 0.5 to 0.7 at the third level.

As described above, in the present application, extraction of a proposal box is divided into three stages, where a small IoU threshold is set at the first stage, for example, the IoU threshold may be set to 0.2 to 0.4. At this stage, more positive samples than those in a case of directly setting the IoU threshold to 0.5 may be obtained at a cost of some precision, which can be understood as preliminary screening herein. Then, at the second stage, sampling is continued on the basis of the previously extracted proposal box. In this case, the IoU threshold for sampling may be set to 0.3 to 0.45, thereby obtaining finer sampling on the basis of the existing sampling. Next, at the third stage, sampling is continued on results of the second stage. In this case, the IoU threshold for sampling may be set to 0.5 to 0.7. Finally, results of the third level are directly output to obtain a final instance segmentation result.

According to an embodiment of the present application, still refer to FIG. 2. When the defect segmentation model is trained, the IoU thresholds for positive and negative sample sampling are set to 0.3 at the first level, are set to 0.4 at the second level, and are set to 0.5 at the third level.

When sampling positive and negative samples, setting a lower IoU threshold at a first stage effectively avoids an overfitting problem caused by an imbalance of positive and negative samples, and in addition, progressive fine sampling is performed by increasing an IoU threshold level by level, to obtain higher feature extraction precision.

According to an embodiment of the present application, still refer to FIG. 2. A defect mask output by the multi-level feature extraction instance segmentation network may be obtained based on a weighted average of defect masks output by an instance segmentation network at each level.

By performing a weighted average on the defect masks output by the network at each level, a result of defect detection is more accurate, and an overkill probability is greatly reduced.

According to an embodiment of the present application, after defect segmentation is performed, the determining the segmented defect mask based on a predefined defect rule to output a defect detection result further includes: when a size or a depth of the segmented defect region is greater than a predefined threshold for a defect type of the defect region, outputting a defect class as a defect detection result.

In some examples, the predefined defect rule may include only detecting a defect in both 2D and 3D pictures, and when a size or a depth of a defect region of the defect is greater than a predefined threshold, an object under detection is identified as a defect class, otherwise the object under detection is identified as a normal class. In other examples, the predefined defect rule may include detecting a defect in a 2D detection result again during 3D detection, or when a depth of the defect is greater than a predefined threshold, an object under detection is identified as a defect class, otherwise the object under detection is identified as a normal class. The predefined defect rule may be different for different types of defects.

According to an embodiment of the present application, the defect type includes a pit defect and a protrusion defect, and the determining the segmented defect mask based on a predefined defect rule to output a defect detection result further includes: when the defect type of the defect region is a pit defect, if both the segmented 2D defect mask and the segmented 3D defect mask include the defect region, or the depth of the defect region is greater than a predefined threshold for the pit defect, outputting a defect class as the defect detection result; or when the defect type of the defect region is a protrusion defect, if both the segmented 2D defect mask and the segmented 3D defect mask include the defect region, and the size and the depth of the defect region are greater than predefined thresholds for the protrusion defect, outputting a defect class as a defect detection result.

For example, in defect detection for a sealing pin weld bead, for a pit-type defect, once a pit in a 2D detection result is detected again during 3D detection, or during the 3D detection, a size or depth of the defect region exceeds a threshold requirement in a specification for a pit, the defect is determined as a defect class (also known as NG). For a protrusion-type defect, after being detected in 2D detection, during the 3D detection, once both a size and a depth of the defect region exceed a threshold requirement in a specification for a protrusion, the defect is determined as a defect class.

Applying different defect rules for determination based on different types of defects makes it possible to adjust a threshold of a defect specification in a customized manner during detection, thereby making a detection algorithm more flexible.

Figure 8:
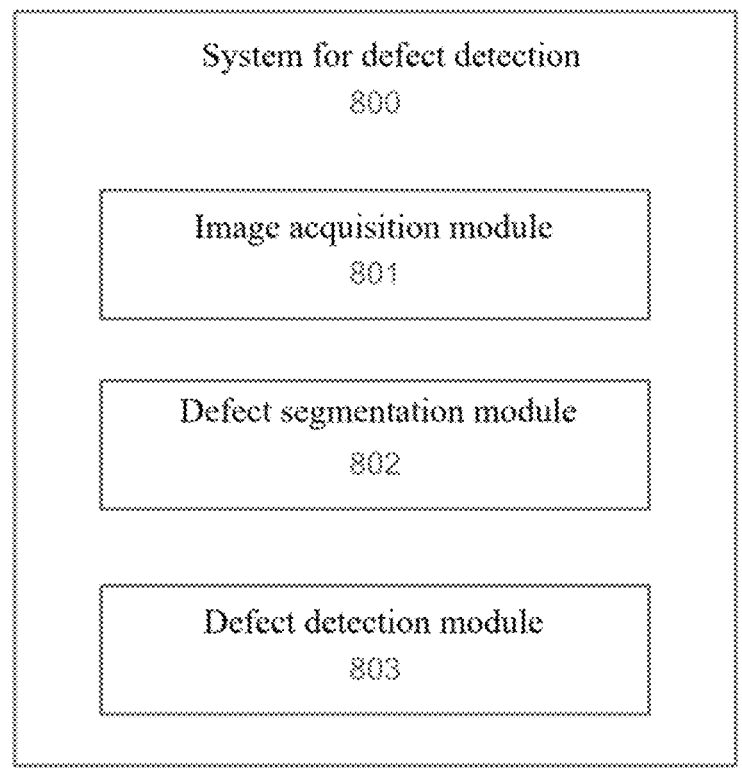
FIG. 8 is a schematic diagram of an architecture of a system for defect detection according to an embodiment of the present application.

FIG. 8 is a schematic diagram of an architecture of a system 800 for defect detection according to an embodiment of the present application. According to an embodiment of the present application, referring to FIG. 8, the system 800 includes at least an image acquisition module 801, a defect segmentation module 802, and a defect determination module 803. The image acquisition module 801 may be configured to acquire a two-dimensional (2D) picture of an object to be detected. The defect segmentation module 802 may be configured to input the acquired 2D picture to a trained defect segmentation model to obtain a segmented 2D defect mask, where the defect segmentation model is trained based on a multi-level feature extraction instance segmentation network with intersection over union (IoU) thresholds being increased level by level, and the 2D defect mask includes information about a defect type, a defect size, and a defect location of a segmented defect region. The defect determination module 803 may be configured to determine the segmented 2D defect mask based on a predefined defect rule to output a defect detection result.

Corresponding to the above method 100 for defect detection, the system for defect detection according to the present application uses an instance segmentation network based on a multi-level feature extraction architecture, such that better segmentation and detection results can be achieved even in an instance segmentation model for which positive samples are particularly difficult to obtain or the number of positive samples are extremely small, to achieve no underkill, and greatly reduce an overkill probability.

According to an embodiment of the present application, the image acquisition module 801 may be further configured to acquire a three-dimensional (3D) picture of the object to be detected. The defect segmentation module 802 may be further configured to: preprocess the acquired 3D picture to obtain an image with depth information of the object to be detected; and input the obtained image with depth information to the trained defect segmentation model to obtain a segmented 3D defect mask, where the 3D defect mask includes information about a defect depth of a segmented defect region. The defect determination module 803 may be further configured to perform, based on a predefined defect rule, fusion and determination on the segmented 2D defect mask and the segmented 3D defect mask to output a defect detection result.

Therefore, when a defect is not obvious in a 2D image form, the results of 2D and 3D detection can be fused to achieve no underkill, and greatly reduce an overkill probability. Herein, for specific details of the operations performed by the modules of the system for defect detection according to the present application, refer to the above descriptions for FIG. 1 to FIG. 7. Details are not described herein again for the sake of brevity.

Those skilled in the art can understand that the system and its modules of the present disclosure may be implemented in hardware or software, and the modules may be merged or combined in any suitable manner.

Figure 9:
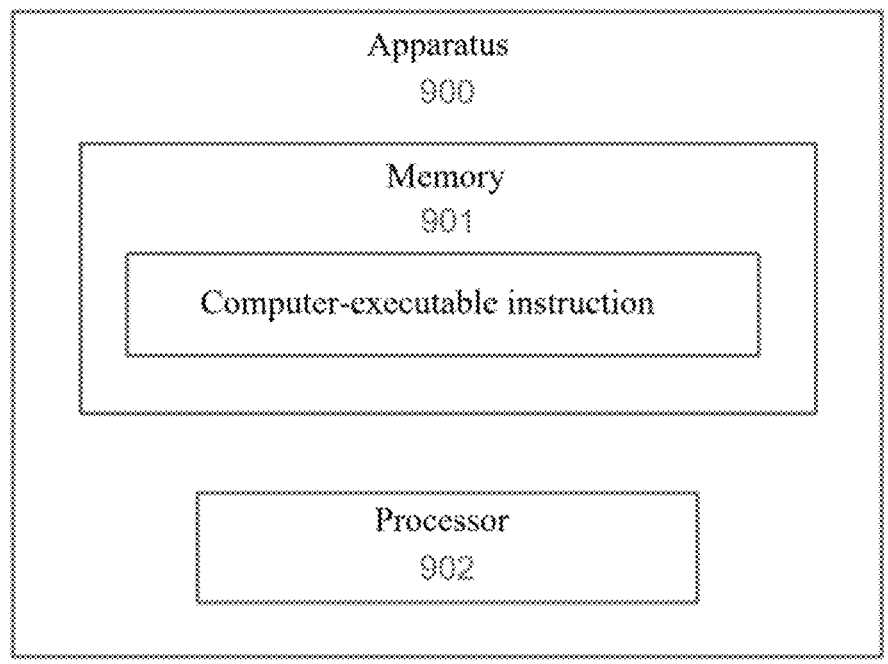
FIG. 9 is a schematic diagram of an architecture of an apparatus for defect detection according to another embodiment of the present application.

FIG. 9 is a schematic diagram of an architecture of an apparatus 900 for defect detection according to another embodiment of the present application. According to an embodiment of the present application, referring to FIG. 9, the apparatus 900 may include a memory 901 and at least one processor 902. The memory 901 may store computer-executable instructions. The computer-executable instructions, when executed by the at least one processor 902, cause the apparatus 900 to perform the following operations: acquiring a two-dimensional (2D) picture of an object to be detected; inputting the acquired 2D picture to a trained defect segmentation model to obtain a segmented 2D defect mask, where the defect segmentation model is trained based on a multi-level feature extraction instance segmentation network with intersection over union (IoU) thresholds being increased level by level, and the 2D defect mask includes information about a defect type, a defect size, and a defect location of a segmented defect region; and determining the segmented 2D defect mask based on a predefined defect rule to output a defect detection result.

The memory 901 may include a RAM, a ROM, or a combination thereof. In some cases, the memory 901 may include, in particular, a basic input/output system (BIOS) that may control basic hardware or software operations, such as interaction with peripheral components or devices. The processor 902 may include an intelligent hardware device (for example, a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof).

Therefore, corresponding to the above method 100 for defect detection, the apparatus for defect detection according to the present application uses an instance segmentation network based on a multi-level feature extraction architecture, such that better segmentation and detection results can be achieved even in an instance segmentation model for which positive samples are particularly difficult to obtain or the number of positive samples are extremely small, to achieve no underkill, and greatly reduce an overkill probability. Herein, the computer-executable instructions, when executed by the at least one processor 902, cause the apparatus 900 to perform various operations described above with reference to FIG. 1 to FIG. 7. Details are not described herein again for the sake of brevity.

The various illustrative blocks and modules described in connection with the disclosure herein can be implemented or performed with a general-purpose processor, a DSP, an ASIC, an FPGA, or another programmable logic device, discrete gate, or transistor logic, a discrete hardware component, or any combination thereof, that is designed to perform functions described herein. The general-purpose processor may be a microprocessor, but in an alternative, the processor may be any conventional processor, controller, microcontroller, or state machine. The processor may be alternatively implemented as a combination of computing devices (for example, a combination of a DSP and a microprocessor, a plurality of microprocessors, one or more microprocessors in conjunction with a DSP core, or any other such configurations).

The functions described herein may be implemented in hardware, software executed by a processor, firmware, or any combination thereof. If implemented in software executed by a processor, the functions may be stored on or transmitted over a computer-readable medium as one or more instructions or codes. Other examples and implementations are within the scope of the present disclosure and the appended claims. For example, due to the nature of software, the functions described herein may be implemented by using software executed by a processor, hardware, firmware, hardwiring, or any combination thereof. Features implementing the functions may also be physically located at various locations, including being distributed such that portions of the functions are implemented at different physical locations.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A method for defect detection, the method comprising:
acquiring a two-dimensional (2D) picture of an object to be detected;
inputting the acquired 2D picture to a trained defect segmentation model to obtain a segmented 2D defect mask, wherein the defect segmentation model is trained based on a multi-level feature extraction instance segmentation network with intersection over union (IoU) thresholds being increased level by level, and the 2D defect mask comprises information about a defect type, a defect size, and a defect location of a segmented defect region; and
determining the segmented 2D defect mask based on a predefined defect rule to output a defect detection result,
wherein the multi-level feature extraction instance segmentation network is obtained by cascading at least three levels of instance segmentation networks.

2. The method of claim 1, wherein the method further comprises:
acquiring a three-dimensional (3D) picture of the object to be detected;
preprocessing the acquired 3D picture to obtain an image with depth information of the object to be detected;
inputting the obtained image with depth information to the trained defect segmentation model to obtain a segmented 3D defect mask, wherein the 3D defect mask comprises information about a defect depth of a segmented defect region; and
performing, based on a predefined detect rule, fusion and determination on the segmented 2D defect mask and the segmented 3D defect mask to output a defect detection result.

3. The method of claim 2, wherein the performing, based on a predefined defect rule, fusion and determination on the segmented 2D defect mask and the segmented 3D defect mask further comprises:
performing pixel-level alignment on the 2D picture and the 3D picture by using a coordinate transformation matrix between the acquired 2D picture and the acquired 3D picture, to obtain aligned pictures;
filling the segmented 2D defect mask and the segmented 3D defect mask into the aligned pictures; and
performing, based on the predefined defect rule, fusion and determination on the segmented 2D defect mask and the segmented 3D defect mask on the aligned pictures to output a defect detection result.

4. The method of claim 1, wherein the multi-level feature extraction instance segmentation network is obtained by cascading three: levels of instance segmentation networks, wherein IoU thresholds for positive and negative sample sampling are set to 0.2 to 0.4 at the first level, are set to 0.3 to 0.45 at the second level, and are set to 0.5 to 0.7 at the third level.

5. The method of claim 4, wherein the IoU thresholds are set to 0.3 at the first level, are set to 0.4 at the second level, and are set to 0.5 at the third level.

6. The method of claim 1, wherein a defect mask output by the multi-level feature extraction instance segmentation network is obtained based on a weighted average of defect masks output by an instance segmentation network at each level.

7. The method of claim 1, wherein the determining the segmented detect mask based on a predefined defect rule to output a defect detection result further comprises:
when a size or a depth of the segmented defect region is greater than a predefined threshold for a defect type of the defect region, outputting a defect class as a defect detection result.

8. The method of claim 1, wherein the defect type comprises a pit defect and a protrusion defect, and the determining the segmented defect mask based on a predefined defect rule to output a defect detection result further comprises:
when the defect type of the defect region is a pit defect, if both the segmented 2D defect mask and the segmented 3D defect mask comprise the defect region, or the depth of the defect region is greater than a predefined threshold for the pit detect, outputting a detect class as the defect detection result; or
when the defect type of the defect region is a protrusion defect, if both the segmented 2D defect mask and the segmented 3D defect mask comprise the defect region, and the size and the depth of the defect region are greater than predefined thresholds for the protrusion defect, outputting a defect class as a defect detection result.

9. A non-transitory computer-readable storage medium storing computer-executable instructions, wherein the computer-executable instructions, when executed by a computing device, cause the computing device to implement tine method for defect detection of claim 1.

10. A system for defect detection, the system comprising circuitry configured to:
acquire a two-dimensional (2D) picture of an object to be detected;
input the acquired 2D picture to a trained defect segmentation model to obtain a segmented 2D defect mask, wherein the defect segmentation model is trained based on a multi-level feature extraction instance segmentation network with intersection over union (IoU) thresholds being increased level by level, and the 2D defect mask comprises information about a defect type, a defect size, and a defect location of a segmented defect region; and
determine the segmented 2D defect mask based on a predefined defect rule to output a defect detection result,
wherein the multi-level feature extraction instance segmentation network is obtained by cascading at least three levels of instance segmentation networks.

11. The system of claim 10, wherein the circuitry is further configured to:
acquire a three-dimensional (3D) picture of the object to be detected;
preprocess the acquired 3D picture to obtain an image with depth information of the object to be detected; and
input the obtained image with depth information to the trained defect segmentation model to obtain a segmented 3D defect mask, wherein the 3D defect mask comprises information about a defect depth of a segmented defect region; and
perform, based on a predefined defect rule, fusion and determination on the segmented 2D defect mask and the segmented 3D defect mask to output a defect detection result.

12. The system of claim 11, wherein the circuitry is further configured to:
perform pixel-level alignment on the 2D picture and the 3D picture by using a coordinate transformation matrix between the acquired 2D picture and the acquired 3D picture, to obtain aligned pictures;

fill the segmented 2D defect mask and the segmented 3D defect mask into the aligned pictures; and perform, based on the predefined detect rule, fusion and determination on the segmented 2D defect mask and the segmented 3D defect mask on the aligned pictures to output a defect detection result.

13. The system of claim 10, wherein the multi-level feature extraction instance segmentation network is obtained by cascading three levels of instance segmentation networks, wherein IoU thresholds for positive and negative sample sampling are set to 0.2 to 0.4 at the first level, are set to 0.3 to 0.45 at the second level, and are set to 0.5 to 0.7 at the third level.

14. The system of claim 13, wherein the IoU thresholds are set to 0.3 at the first level, are set to 0.4 at the second level, and are set to 0.5 at the third level.

15. The system of claim 10, wherein a defect mask output by the multi-level feature extraction instance segmentation network is obtained based on a weighted average of defect masks output by an instance segmentation network at each level.

16. The system of claim 10, wherein the circuitry defect determination module is further configured to:

when a size or a depth of the segmented defect region is greater than a predefined threshold for a defect type of the defect region, output a defect class as a defect detection result.

17. The system of claim 10, wherein the defect type comprises a pit defect and a protrusion defect, and the circuitry is further configured to:

when the defect type of the defect region is a pit defect, if both the segmented 2D defect mask and the segmented 3D defect mask comprise the detect region, or the depth of the defect region is greater than a predefined threshold for the pit defect, output a defect class as the defect detection result; or when the defect type of the defect region is a protrusion defect, if both the segmented 2D defect mask and the segmented 3D defect mask comprise the defect region, and the size and the depth of the defect region are greater than predefined thresholds for the protrusion detect, output a defect class as a defect detection result.

* * * * *